United States Patent
Handzel, Jr. et al.

(10) Patent No.: US 9,764,609 B2
(45) Date of Patent: Sep. 19, 2017

(54) SYSTEMS AND METHODS FOR TIRE WARMING

(71) Applicant: GM GLOBAL TECHNOLOGY OPERATIONS LLC, Detroit, MI (US)

(72) Inventors: J. William Handzel, Jr., Beverly Hills, MI (US); Patrick Hartman, Canton, MI (US)

(73) Assignees: KELSEY-HAYES COMPANY, Livonia, MI (US); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/983,693

(22) Filed: Dec. 30, 2015

(65) Prior Publication Data

US 2017/0190228 A1 Jul. 6, 2017

(51) Int. Cl.
*B60C 99/00* (2006.01)
*B60W 10/184* (2012.01)
*B60W 10/04* (2006.01)
*B60W 30/02* (2012.01)

(52) U.S. Cl.
CPC .......... *B60C 99/003* (2013.01); *B60W 10/04* (2013.01); *B60W 10/184* (2013.01); *B60W 30/02* (2013.01); *B60W 2510/10* (2013.01); *B60W 2540/10* (2013.01); *B60W 2710/18* (2013.01); *B60W 2720/28* (2013.01)

(58) Field of Classification Search
CPC .................................................. B60C 99/003
See application file for complete search history.

(56) References Cited

U.S. PATENT DOCUMENTS

| | | | |
|---|---|---|---|
| 6,406,103 B1 * | 6/2002 | Elliott | B60T 1/02 303/20 |
| 9,174,616 B2 * | 11/2015 | Taylor | B60T 13/662 |
| 2009/0112437 A1 * | 4/2009 | Luehrsen | B60T 8/175 701/84 |
| 2011/0175438 A1 * | 7/2011 | Mlynarczyk | B60T 8/175 303/20 |
| 2016/0059834 A1 * | 3/2016 | Lamb | B60T 11/105 303/20 |

* cited by examiner

*Primary Examiner* — Adam Tissot
*Assistant Examiner* — Michael Berns
(74) *Attorney, Agent, or Firm* — Lorenz & Kopf, LLP

(57) ABSTRACT

Methods and apparatus are provided for warming a tire of a driven wheel of a vehicle, in which the vehicle includes one or more driven wheels and one or more non-driven wheels. The method includes determining a range of a transmission associated with the vehicle and determining a position of a throttle pedal associated with an engine of the vehicle. Based on the determined range of the transmission and the determined position of the throttle pedal, the method includes outputting one or more control signals to apply a braking force to the one or more non-driven wheels of the vehicle and outputting one or more control signals to drive the one or more driven wheels to warm the tire of the one or more driven wheels.

18 Claims, 4 Drawing Sheets

SYSTEMS AND METHODS FOR TIRE WARMING

TECHNICAL FIELD

The present disclosure generally relates to tire warming and more particularly relates to systems and methods for on-vehicle warming of tires associated with one or more driven wheels to improve performance.

BACKGROUND

Generally, vehicles include a source of propulsion that provides power to a driveline to drive one or more wheels (i.e. driven wheels) to move the vehicle. Vehicle performance in certain areas, such as acceleration, is impacted based on a temperature of the tires associated with the driven wheels. For example, during a maximum acceleration event, having driven tires that are at or below ambient temperature may reduce the performance of the vehicle.

Accordingly, it is desirable to provide systems and methods for on-vehicle warming of tires associated with one or more driven wheels of the vehicle to improve vehicle performance, such as during a maximum performance acceleration event. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for warming a tire of a driven wheel of a vehicle. The vehicle includes one or more driven wheels and one or more non-driven wheels. The method includes determining a range of a transmission associated with the vehicle and determining a position of a throttle pedal associated with an engine of the vehicle. Based on the determined range of the transmission and the determined position of the throttle pedal, the method includes outputting one or more control signals to apply a braking force to the one or more non-driven wheels of the vehicle and outputting one or more control signals to drive the one or more driven wheels to warm the tire of the one or more driven wheels.

In one embodiment, a system for warming a tire associated with a driven wheel of a vehicle is provided. The vehicle includes one or more driven wheels and one or more non-driven wheels. The system includes a source of range data associated with a transmission of the vehicle, and a source of data that indicates a position of a throttle pedal associated with the vehicle. The system also includes a control module having a processor that outputs one or more control signals to apply a brake torque to the one or more non-driven wheels based on the range of the transmission and the position of the throttle pedal, and outputs one or more control signals to drive the one or more driven wheels to warm the tire of the one or more driven wheels based on the position of the throttle pedal.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
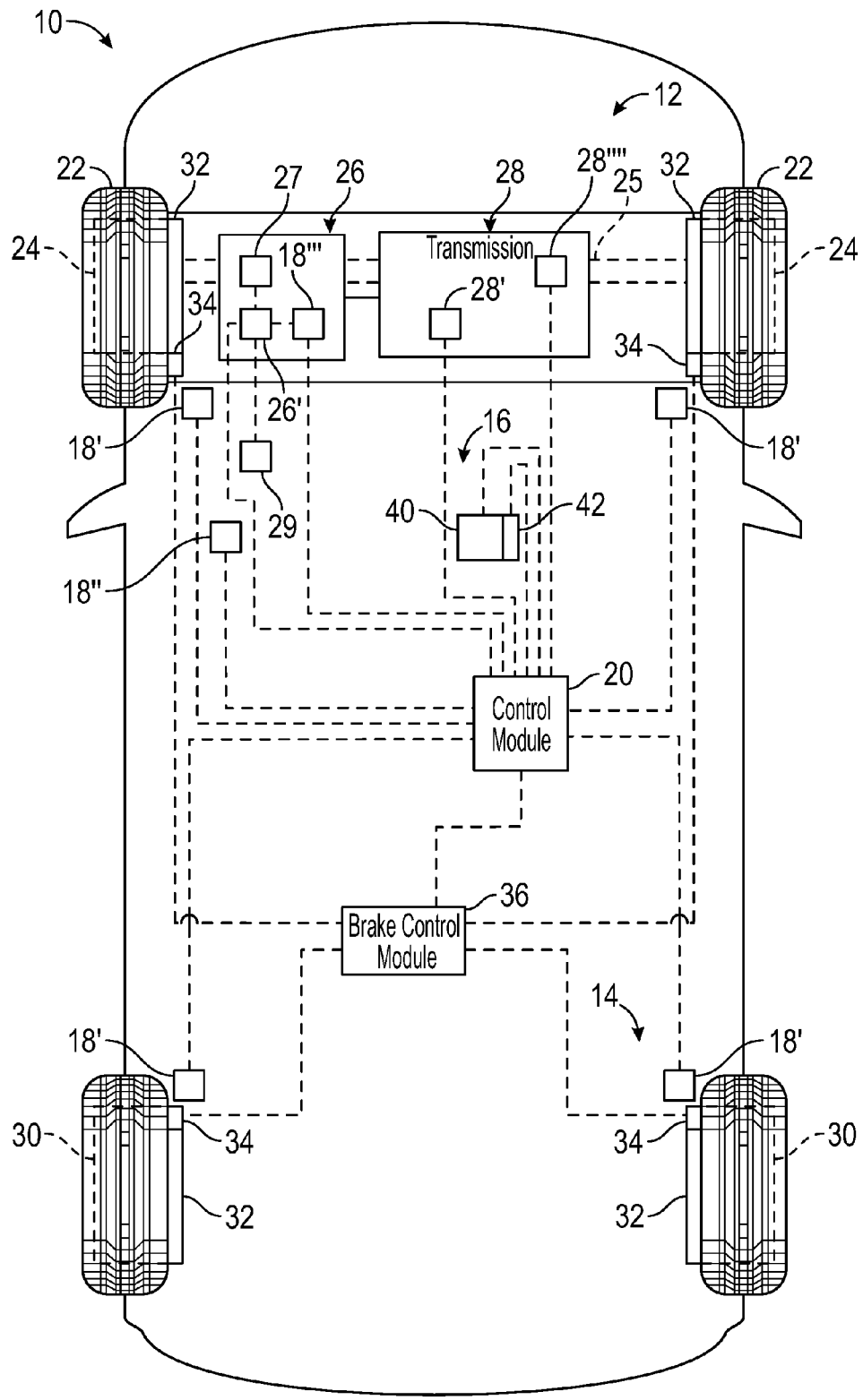
FIG. 1 is a schematic illustration of a system for warming tires associated with one or more driven wheels of a vehicle in accordance with various embodiments.

With reference to FIG. 1, one example of a vehicle 10 having a tire warming system is shown in accordance with various embodiments. The vehicle 10 includes a powertrain 12, a brake system 14, a driver communication system 16, one or more sensors 18, and a control module 20 in accordance with various embodiments. As will be discussed further herein, the control module 20 enables tires 22 associated with driven wheels 24 of the vehicle 10 to be warmed. Generally, the control module 20 rotates the driven tires 22 of the driven wheels 24 at a speed greater than the vehicle speed to warm the tires 22. By warming or increasing the temperature of the tires 22, the tires 22 have a greater grip on a road surface, which is desirable during certain operating conditions associated with the vehicle 10, such as during a maximum performance acceleration event. Although the figures shown herein depict an example with certain arrangements of elements, additional intervening elements, devices, features, or components may be present in an actual embodiment. It should also be understood that FIG. 1 is merely illustrative and may not be drawn to scale. Moreover, while FIG. 1 depicts a front-wheel drive vehicle, it will be understood that the teachings of the present disclosure may be applied to rear-wheel drive vehicles, and thus, the front-wheel drive vehicle of FIG. 1 is merely exemplary.

The powertrain 12 includes a propulsion device, such as an engine 26, which supplies power to a transmission 28. In one example, the engine 26 is an internal combustion engine that is controlled by an engine control module 26'. The engine control module 26' is in communication with the control module 20 through a suitable communication architecture or arrangement that facilitates transfer of data, commands, power, etc. The engine control module 26' receives one or more control signals from the control module 20 to adjust a power output of the engine 26. In the example of an internal combustion engine, a position of the throttle valve 27 is electrically adjustable by the engine control module 26' based on a driver input to a throttle pedal 29, such as an accelerator pedal, to control the power output by the engine 26. It should be noted that the use of an internal combustion engine is merely exemplary, as the propulsion device can be a fuel cell, electric motor, a hybrid-electric motor, etc., which is responsive to one or more control signals from the control module 20 to reduce a power output by the propulsion device. As used herein, the "throttle pedal" is a pedal disposed in a passenger compartment of the vehicle 10, and is movable by the driver of the vehicle 10 between a variety of positions to control a power output by the engine 26, such as a zero percent throttle position (no power output by the engine 26) to a wide open throttle or 100 percent throttle position (full power output by the engine 26) and numerous positions in-between.

The transmission 28 transfers the power from the engine 26 to a suitable driveline 25 coupled to one or more driven wheels 24 (and tires 22) of the vehicle 10 to enable the vehicle 10 to move. As is known to one skilled in the art, the transmission 28 can comprise a suitable gear transmission, which can be operated in a variety of ranges containing one or more gears, including, but not limited to a park range, a neutral range, a reverse range, a drive range, a low range, etc. A current range of the transmission 28 is communicated or transmitted to the control module 20 through a suitable communication architecture or arrangement that facilitates transfer of data, commands, power, etc. The current range of the transmission 28 may be provided by a transmission control module 28' in communication with the control module 20, or may be provided by a sensor that observes a range shifter or range selection unit associated with the transmission 28, as known to one of skill in the art.

The brake system 14 is coupled to the driven wheels 24 and non-driven wheels 30 of the vehicle 10. The non-driven wheels 30 are coupled to the vehicle 10 for rotation about a suitable axle as is generally known in the art. It should be noted that the term "driven wheel" is used herein to denote a wheel that is directly coupled to the driveline to receive power from the engine 26 via the transmission 28, and a "non-driven" wheel is a wheel that does not receive power from the engine 26 via the transmission 28. In various embodiments, the brake system 14 for each of the driven wheels 24 and the non-driven wheels 30 includes at least a brake disc 32 and a caliper 34. A respective brake disc 32 is coupled to a respective one of the driven wheels 24 and the non-driven wheels 30. Each caliper 34 is responsive to one or more control signals from a brake control module 36 to apply a specified force or brake pressure to the brake disc 32 to slow the rotation of the respective one of the driven wheels 24 and the non-driven wheels 30 as is generally known. The brake control module 36 is in communication with the control module 20 through a suitable communication architecture or arrangement that facilitates transfer of data, commands, power, etc. As will be discussed herein, the brake control module 36 receives one or more control signals from the control module 20 to communicate or transmit one or more control signals to the calipers 34 of the non-driven wheels 30 to slow the rotation of the non-driven wheels 30 during a tire warming event. It should be noted that the use of brake discs 32 and calipers 34 is merely exemplary, as the vehicle 10 may have any brake system that may be responsive to one or more control signals from the control module 20 and that may operate to slow the rotation of the non-driven wheels 30 known in the art.

The driver communication system 16 displays data for the driver and occupants of the vehicle 10, and also receives input from the driver and occupants of the vehicle 10. In various embodiments, the driver communication system 16 includes a display 40 or other output device, and an input device 42. The display 40 can be implemented as a flat panel display or other display type that is integrated with an instrument panel or console of the vehicle 10. Those skilled in the art realize other techniques to implement the display 40 in the vehicle 10. The display 40 is in communication with the control module 20 over a suitable communication architecture or arrangement that facilitates transfer of data, commands, power, etc. The display 40 is in communication with the control module 20 to output one or more notifications to the driver and occupant of the vehicle with regard to a tire warming event.

In various embodiments, the input device 42 receives inputs from the driver and/or occupant of the vehicle 10, such as a request to activate or enable a tire warming event by the control module 20, as will be discussed herein. The input device 42 may be implemented as a keyboard (not separately shown), a microphone (not separately shown), a touchscreen layer associated with the display 40, or other suitable device to receive data and/or commands from the user. Of course, multiple input devices 42 can also be utilized. For example, at least one input device may be coupled to a hand wheel associated with a steering system of the vehicle 10. In addition, at least one input device may be coupled to an instrument panel or console associated with the vehicle 10, such as a push button, etc. Thus, the input device 42 is merely exemplary. The input device 42 is in communication with the control module 20 over a suitable communication architecture or arrangement that facilitates transfer of data, commands, power, etc.

The one or more sensors 18 sense observable conditions associated with the vehicle 10 and generate sensor signals based thereon. In various embodiments, the one or more sensors 18 include one or more wheel speed sensors 18', a vehicle speed sensor 18", a throttle position sensor 18''' and a transmissions sensor 18''''. The one or more sensors 18 communicate with the control module 20 over a suitable arrangement that facilitates transfer of data, commands, power, etc. The wheel speed sensors 18' each observe a speed of a respective one of the driven wheels 24 and the non-driven wheels 30, and generate sensor signals based thereon. The vehicle speed sensor 18″ observes a speed of the vehicle 10, and generates sensor signals based thereon. The throttle position sensor 18‴ observes a position of the throttle pedal 29, and generates sensor signals based thereon. The transmissions sensor 18″″ observes a speed of the driveline 25 and generates sensor signals based thereon.

In various embodiments, the control module 20 outputs one or more control signals to the calipers 34 associated with the non-driven wheels 30 based on one or more of the sensor signals and input from the input device 42, and further based on the tire warming systems and methods of the present disclosure. The control module 20 outputs the one or more control signals to the calipers 34 to allow the tires 22 associated with the driven wheels 24 to spin or rotate at a speed greater than the speed of the vehicle 10 to raise the temperature of the tires 22 of the driven wheels 24. As will be discussed, the control module 20 outputs the one or more control signals to the calipers 34 associated with the non-driven wheels 30 based on the sensor signals from the one or more sensors 18, based on input data from the input device 42 and/or further based on range data from the transmission 28. In various embodiments, the control module 20 outputs one or more control signals to adjust a power output by the engine 26 based on the sensor signals from the one or more sensors 18. In various embodiments, the control module 20 outputs an interface for display on the display 40 based on the sensor signals from the one or more sensors 18.

Figure 2:
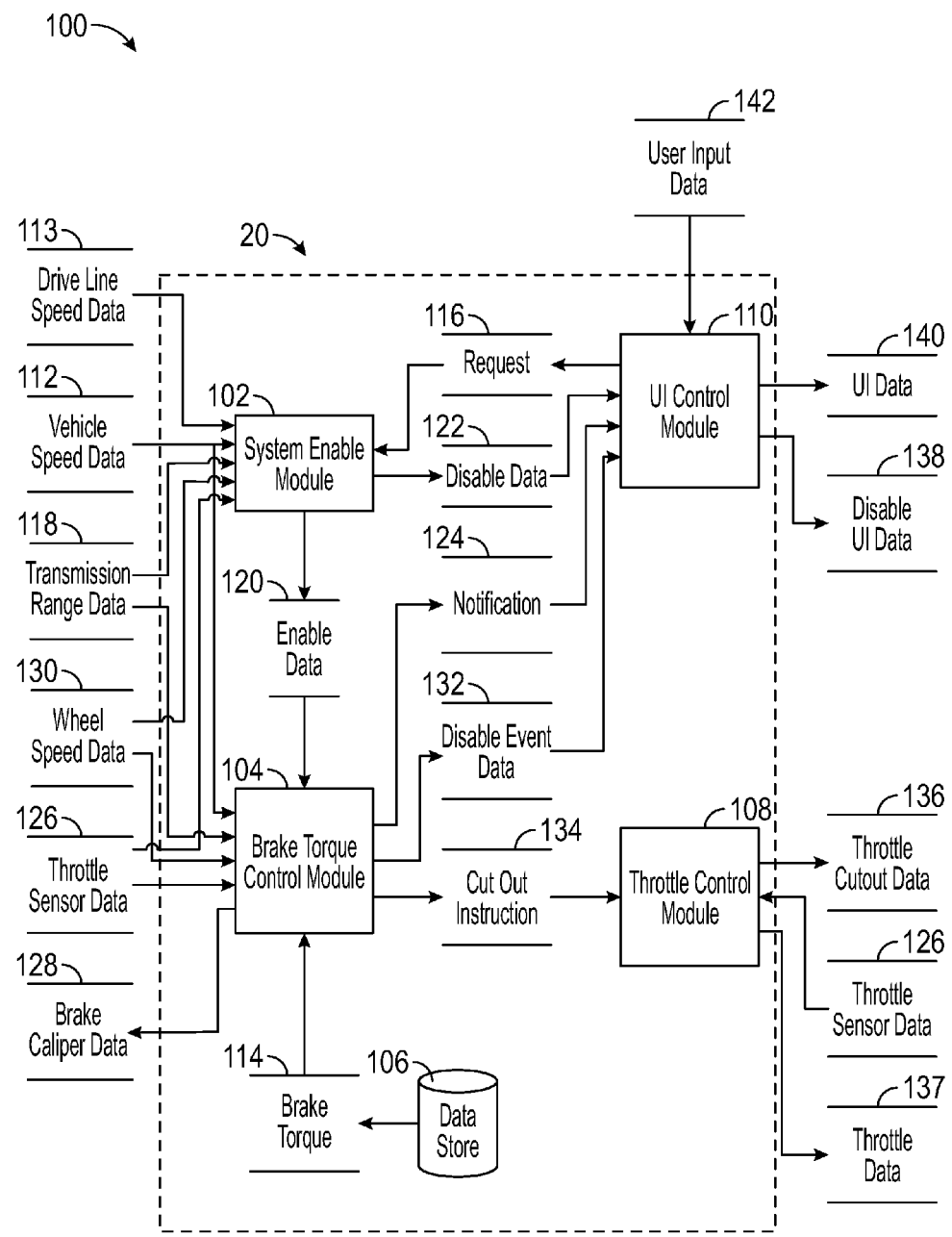
FIG. 2 is a dataflow diagram illustrating a control system of the system of FIG. 1 in accordance with various embodiments.

Referring now to FIG. 2, and with continued reference to FIG. 1, a dataflow diagram illustrates various embodiments of a control system 100 for the vehicle 10 for warming the tires 22 associated with the one or more driven wheels 24, which may be embedded within the control module 20. Various embodiments of the control system 100 according to the present disclosure can include any number of sub-modules embedded within the control module 20. As can be appreciated, the sub-modules shown in FIG. 2 can be combined and/or further partitioned to similarly control the calipers 34 of the non-driven wheels 30, the throttle pedal 29 and to output the interface for display on the display 40. Inputs to the control system 100 may be received from the one or more sensors 18 (FIG. 1), received from the input device 42 of the driver communication system 16 (FIG. 1), received from the engine control module 26′ (FIG. 1), received from the transmission control module 28′ (FIG. 1), received from other control modules (not shown), and/or determined/modeled by other sub-modules (not shown) within the control module 20. In various embodiments, the control module 20 includes a system enable module 102, a brake torque control module 104, a data store 106, a throttle control module 108 and a user interface (UI) control module 110.

The data store 106 stores one or more tables (e.g., lookup tables) that indicate a brake torque to be applied to the non-driven wheels 30 based on vehicle speed data 112 estimated from the one or more sensors 18 In other words, the data store 106 stores one or more tables that provide an amount of brake torque to be applied by the calipers 34 to the brake discs 32 based on various estimated speeds of the vehicle 10. The one or more tables comprise calibration tables, which are acquired based on experimental data. In various embodiments, the tables may be interpolation tables that are defined by one or more indexes. A brake torque value 114 provided by at least one of the tables indicates a value for the brake torque to be output by the calipers 34 associated with the non-driven wheels 30 to slow the rotation of the non-driven wheels 30 based on the estimated speed of the vehicle 10. As an example, one or more tables can be indexed by various parameters such as, but not limited to, estimated vehicle speed, to provide the brake torque value 114.

The system enable module 102 receives as input request data 116 from the UI control module 110. The request data 116 comprises a request received by the UI control module 110 from the user to enable a tire warming event to raise the temperature of the tires 22 associated with the driven wheels 24. It will be noted, however, that the request data 116 may be received from other systems associated with the vehicle 10. For example, the request data 116 may be generated based on sensor signals from one or more tire temperature sensors, which indicate that the temperature of the tires 22 associated with the driven wheels 24 is below a threshold. Thus, the receipt of the request data 116 from the UI control module 110 is merely exemplary.

Based on the request data 116, the system enable module 102 receives as input transmission range data 118. The transmission range data 118 comprises a range of the transmission 28, which may be received from the transmission control module 28′ or from a sensor that observes a range selection unit or range shifter associated with the vehicle 10. The system enable module 102 also receives as input vehicle speed data 112, driveline speed data 113, throttle sensor data 126 and wheel speed data 130. The vehicle speed data 112 comprises the sensor signals from the vehicle speed sensor 18″. The driveline speed data 113 comprises the sensor signals from the transmissions sensor 18″″. The throttle sensor data 126 comprises the sensor signals from the throttle position sensor 18‴. The wheel speed data 130 comprises a wheel speed or speed of rotation associated with each of the driven wheels 24 and non-driven wheels 30 of the vehicle 10 as observed by the respective wheel speed sensors 18′. Based on one or more of the vehicle speed data 112, the driveline speed data 113, the throttle sensor data 126 and the wheel speed data 130, the system enable module 102 estimates a speed for the vehicle 10 or calculates an estimated vehicle speed. Thus, the wheel speed sensors 18′, the vehicle speed sensor 18″, the throttle position sensor 18‴ and the transmissions sensor 18″″ may all be considered a source of vehicle speed data for the vehicle 10.

Based on the transmission range data 118 and the estimated vehicle speed, the system enable module 102 determines whether or not to enable the tire warming event. If it is determined to enable the tire warming event, the system enable module 102 sets enable data 120 for the brake torque control module 104. Generally, the enable data 120 is set based on the transmission 28 of the vehicle 10 being in a park range or a neutral range and the estimated speed of the vehicle 10 being about zero miles per hour (mph). If, based on the estimated vehicle speed and the transmission range data 118, the system enable module 102 determines to not enable a tire warming event, disable data 122 is set for the UI control module 110. The disable data 122 comprises a message to be output to the driver and occupants of the vehicle 10, for display on the display 40, for example, that the tire warming event request is not enabled.

The brake torque control module 104 receives as input the enable data 120. Based on the enable data 120, the brake torque control module 104 sets a notification 124 for the UI control module 110. As will be discussed, the notification 124 comprises a message to be output by the UI control module 110 for display on the display 40 to instruct the driver of the vehicle 10 that the tire warming event is enabled, and to instruct the driver to place the transmission 28 into a drive range or a low range, via a range selector unit or range shifter associated with the transmission 28, for example. The brake torque control module 104 receives as input the transmission range data 118. The brake torque control module 104 determines whether the transmission of the vehicle 10 is in a drive range based on the transmission range data 118.

The brake torque control module 104 receives as input the throttle sensor data 126 and the vehicle speed data 112. The brake torque control module 104 interprets the throttle sensor data 126 and determines a position of the throttle pedal 29 or a percentage of which the throttle pedal 29 has moved towards the wide open throttle or full throttle position. Based on the throttle sensor data 126, the brake torque control module 104 determines whether the position of the throttle pedal 29 has changed from about zero percent or no throttle to about wide open throttle, or about 100% throttle. The brake torque control module 104 determines whether the position of the throttle pedal 29 is held at about 96% of wide open or full throttle and if true, queries the data store 106 for the brake torque value 114 based on the vehicle speed data 112. Based on the brake torque value 114, the brake torque control module 104 outputs brake caliper data 128. The brake caliper data 128 comprises one or more control signals to the brake control module 36 for the calipers 34 associated with the non-driven wheels 30 to apply a brake pressure or braking force to maintain the vehicle 10 at a desired speed during the tire warming event. For example, the brake caliper data 128 comprises one or more control signals to the calipers 34 to apply a brake pressure to the respective brake discs 32 to maintain a brake torque such that the speed of the vehicle 10 is kept below a calibrated value, such as about 8.0 miles per hour, for example, for a front wheel drive vehicle, and is kept below a calibrated value, such as about 3.0 miles per hour, for example, for a rear-wheel drive vehicle. The brake torque control module 104 may also output brake caliper data 128 that comprises one or more control signals to reset a position of the calipers 34 of the non-driven wheels 30 to an initial state, in which no braking pressure is applied. For example, at the end of a tire warming event, the brake torque control module 104 may output brake caliper data 128 that reduces the brake pressure applied by the calipers 34 such that the calipers 34 are released from the brake discs 32 associated with the non-driven wheels 30.

The brake torque control module 104 also receives as input wheel speed data 130 from the wheel speed sensors 18'. Based on the wheel speed data 130, the brake torque control module 104 determines whether the driven wheels 24 are rotating at substantially the same speeds. If the wheel speed data 130 indicates that the driven wheels 24 are rotating at different speeds, the brake torque control module 104 outputs disable event data 132 for the UI control module 110. The disable event data 132 comprises a message for display on the display 40, for example, that the tire warming event has been disabled or discontinued.

Once the tire warming event is enabled based on the enable data 120, the brake torque control module 104 starts a timer. Upon the expiration of a predetermined period of time, such as about 12.0 seconds, the brake torque control module 104 sets a cutout instruction 134 for the throttle control module 108. The cutout instruction 134 comprises an instruction to reduce the power supplied by the engine 26 to the transmission 28, and thus, the drivetrain and driven wheels 24. Generally, the predetermined period of time is a default or factory set period of time, which is based on the characteristics of the tires 22 associated with the driven wheels 24, such as the amount of friction over a period of time required to raise the temperature of the tires 22 to a desired operating temperature. Alternatively, the period of time may be user-defined via one or more inputs received via the input device 42.

The throttle control module 108 receives as input the cutout instruction 134 from the brake torque control module 104. Based on the cutout instruction 134, the throttle control module 108 outputs throttle cutout data 136. The throttle cutout data 136 comprises one or more control signals to the engine control module 26' to reduce the power output by the engine 26, which enables the throttle pedal 29 to return to about zero percent or no throttle, thereby re-setting the position of the throttle pedal 29. The throttle control module 108 also receives as input the throttle sensor data 126. The throttle control module 108 interprets the throttle sensor data 126 and determines a position of the throttle pedal 29. Based on the position of the throttle pedal 29, the throttle control module 108 outputs throttle data 137. The throttle data 137 comprises one or more control signals to the engine control module 26' for the engine 26 to output power to the transmission 28 to drive the driven wheels 24 via the driveline coupled to the one or more driven wheels 24 based on the position of the throttle pedal 29.

The UI control module 110 receives as input the disable data 122 from the system enable module 102. Based on the disable data 122, the UI control module 110 generates disable user interface data 138, which may comprise a graphical and/or textual notification that the tire warming event is disabled, for display on the display 40. For example, the disable user interface data 138 may comprise the message "Tire Warming Disabled." In addition, based on the disable data 122, the UI control module 110 and/or the brake torque control module 104 may output one or more control signals to one or more indicators associated with the vehicle 10, such as one or more lights associated with an instrument panel. Thus, the use of a user interface to inform the driver that the tire warming event has been disabled is merely exemplary.

The UI control module 110 receives as input the notification data 124 from the brake torque control module 104. Based on the notification data 124, the UI control module 110 generates user interface data 140 for display on the display 40 that includes a graphical and/or textual notification that the tire warming event is enabled and to shift the vehicle 10 into the drive range. For example, the user interface data 140 may include the message "Tire Warming Enabled: Shift to Drive or Low" or something similar, which is display on the display 40. In addition, based on the notification data 124, the UI control module 110 and/or the brake torque control module 104 may output one or more control signals to one or more indicators associated with the vehicle 10, such as one or more lights associated with an instrument panel. Thus, the use of a user interface to inform the driver that the tire warming event has been enabled is merely exemplary.

The UI control module 110 receives as input the disable event data 132 from the brake torque control module 104. Based on the disable event data 132, the UI control module 110 generates the disable user interface data 138, which may comprise a graphical and/or textual notification that the tire warming event is disabled, for display on the display 40. It should be noted, however, that based on the disable event data 132, the UI control module 110 and/or the brake torque control module 104 may output one or more control signals to one or more indicators associated with the vehicle 10, such as one or more lights associated with an instrument panel.

The UI control module 110 also receives as input user input data 142 from the input device 42. The user input data 142 comprises an input or request from the user to initiate a tire warming event. The UI control module 110 interprets the user input data 142 and sets the request data 116 for the system enable module 102. It should be noted that the user input data 142 need not include a single input received to the input device 42 to initiate the tire warming event. Rather, the UI control module 110 may set the request data 116 after a particular series of inputs is received by the input device 42.

Figure 3:
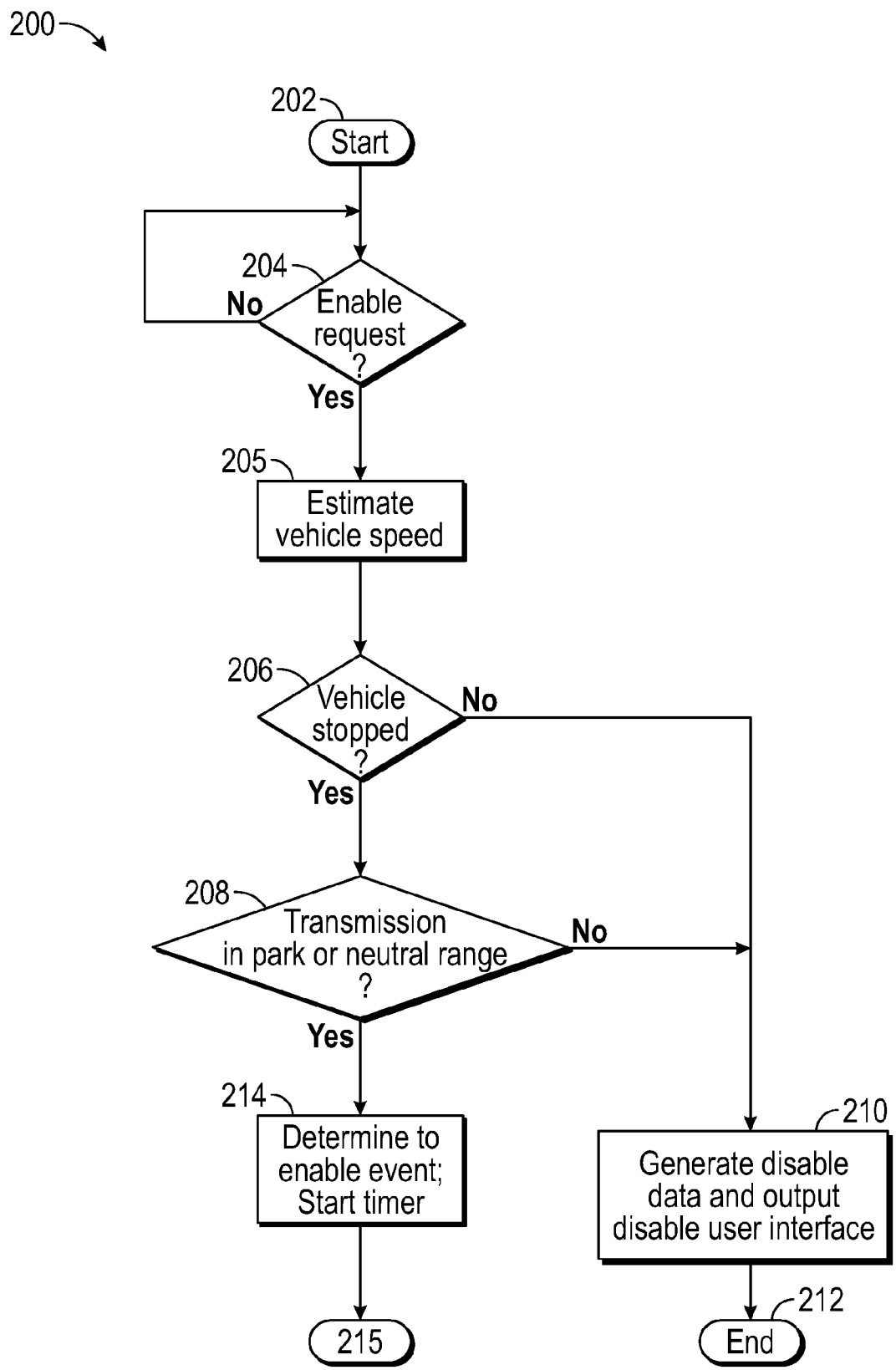
FIG. 3 is a flowchart illustrating a control method of the system of FIG. 1 in accordance with various embodiments.
Figure 4:
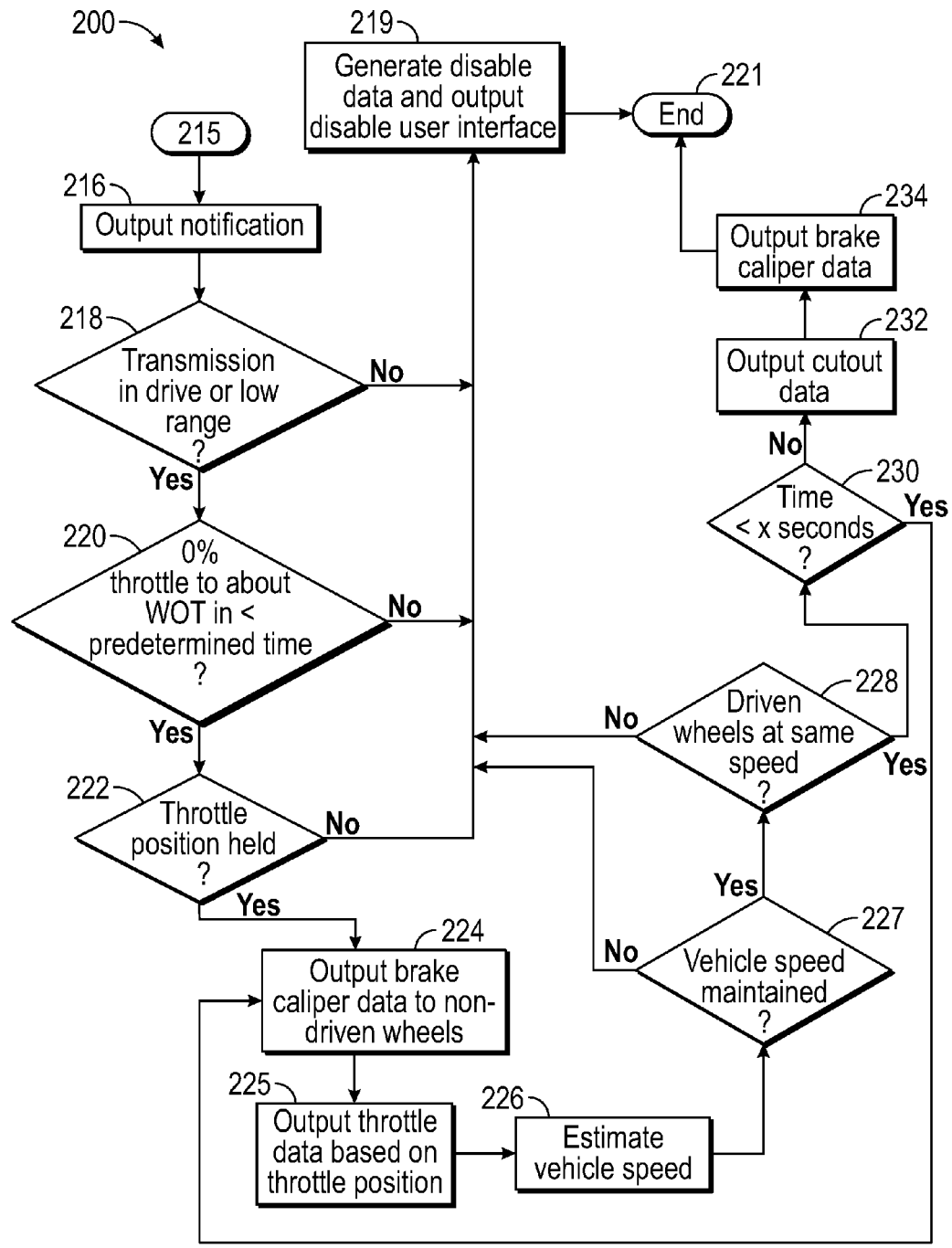
FIG. 4 is a continuation of the flowchart of FIG. 3 in accordance with various embodiments.

Referring now to FIGS. 3-4, and with continued reference to FIGS. 1-2, a flowchart illustrates a control method 200 that can be performed by the control module 20 of FIGS. 1-2 in accordance with the present disclosure. As can be appreciated in light of the disclosure, the order of operation within the method is not limited to the sequential execution as illustrated in FIGS. 3-4, but may be performed in one or more varying orders as applicable and in accordance with the present disclosure.

In various embodiments, the method can be scheduled to run based on predetermined events, and/or can run based on the receipt of user input data 142.

In one example, the method begins at 202. At 204, the method determines whether a request to enable a tire warming event has been received, based on the user input data 142. Based on the receipt of the user input data 142 indicating a request to enable a tire warming event, the method proceeds to 205. Otherwise, the method continues to determine whether a request has been received.

At 205, the method estimates the speed of the vehicle 10 based on one or more of the vehicle speed data 112, driveline speed data 113, throttle sensor data 126 and wheel speed data 130. At 206, the method determines based on the estimated vehicle speed, whether the vehicle 10 is stopped or has substantially no speed. If the vehicle 10 is determined to have stopped or have substantially no speed, the method proceeds to 208. Otherwise, the method proceeds to 210. At 210, the method generates the disable data 122 and outputs the disable user interface data 138 to inform the driver of the vehicle 10 that the tire warming event has been disabled. The method ends at 212.

At 208, the method determines, based on the transmission range data 118, whether the range of the transmission 28 is a park range or a neutral range. If the transmission 28 is in a park range or a neutral range, the method proceeds to 214. Otherwise, the method proceeds to 210.

At 214, the method determines to enable the tire warming event, generates the enable data 120 and starts a timer. With the tire warming event enabled, the method proceeds to 215 on FIG. 4.

With reference to FIG. 4, at 216, the method outputs the user interface data 140, which comprises a notification that the tire warming event is enabled and to shift the transmission 28 into the drive range. At 218, the method determines based on the transmission range data 118 whether the transmission 28 is in the drive range or the low range. If the transmission 28 is in the drive range or the low range, the method proceeds to 220. Otherwise, the method proceeds to 219. At 219, the method generates the disable event data 132 and outputs the disable user interface data 138 based thereon. The method ends at 221.

At 220, the method determines, based on the throttle sensor data 126 from the throttle position sensor 18''', whether the throttle pedal 29 has moved from about zero percent throttle to about wide open throttle or about 100% throttle in less than a predetermined period of time, such as, but not limited to, about 0.5 seconds (s). If, based on the throttle sensor data 126, the throttle pedal 29 has moved from about zero percent throttle to about wide open throttle in less than 0.5 seconds (s), the method proceeds to 222. Otherwise, the method proceeds to 219.

At 222, the method determines, based on the throttle sensor data 126, if the position of the throttle pedal 29 is held by the driver to remain within about at least 96% of wide open throttle. If the position of the throttle pedal 29 is held to remain within about at least 96% of wide open throttle, the method proceeds to 224. Otherwise, the method proceeds to 219.

At 224, the method queries the data store 106 for the brake torque value 114 based on the estimated vehicle speed, and outputs the brake caliper data 128 based on the retrieved brake torque value 114. At 225, the method outputs the throttle data 137 to the engine control module 26' based on the position of the throttle pedal 29 determined from the throttle sensor data 126. Based on the receipt of the throttle data 137, the engine control module 26' controls the engine 26 to output power to drive the driven wheels 24 based on the position of the throttle pedal 29. The output of power from the engine 26 to the driven wheels 24 while the calipers 34 of the non-driven wheels 30 are applying a brake force to the non-driven wheels 30 causes the driven wheels 24 to rotate or spin. The spinning of the driven wheels 24 creates friction between the tires 22 of the driven wheels 24 and the road surface, thereby increasing a temperature of the tires 22 of the driven wheels 24. Generally, the tires 22 rotate at a speed at or above the speed of the vehicle 10 to increase the temperature of the tires 22 of the driven wheels 24.

At 226, the method receives the input from one or more of the wheel speed sensors 18', the vehicle speed sensor 18'', the throttle position sensor 18''' and the transmissions sensor 18'''' (i.e. the vehicle speed data 112, the driveline speed data 113, the throttle sensor data 126 and the wheel speed data 130) and estimates the speed of the vehicle 10. At 227, the method determines, based on the estimated vehicle speed, whether the speed of the vehicle 10 is maintained. For example, the method determines based on the vehicle speed data 112, the driveline speed data 113, the throttle sensor data 126 and the wheel speed data 130, whether the estimated speed of the vehicle 10 is less than or equal to the calibrated value, such as about 8.0 miles per hour for a front-wheel drive vehicle, or less than or equal to the calibrated value, such as about 3.0 miles per hour for a rear-wheel drive vehicle. If the estimated speed of the vehicle 10 is maintained, the method goes to 228. Otherwise, the method proceeds to 219.

At 228, the method determines, based on the wheel speed data 130, whether the speed of the driven wheels 24 is substantially the same, such that the driven wheels 24 are rotating at substantially the same speed. If the speed of the driven wheels 24 is different, the method proceeds to 219. Otherwise, at 230, the method determines whether the timer is less than the predetermined threshold of time required to warm the tires 22 of the driven wheels 24. If the timer is less than the predetermined threshold of time, the method loops to 224. Otherwise, if the timer is greater than the predetermined period of time, such as greater than about 12.0 seconds (s), the method proceeds to 232. At 232, the method outputs the throttle cutout data 136 to reduce the power supplied by the engine 26, and thereby enabling the throttle pedal 29 to return to the zero percent throttle position. At 234, the method outputs the brake caliper data 128 to reduce the brake torque applied by the calipers 34 to re-set the brake system 14 such that the calipers 34 are returned to an initial position. The method ends at 221.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for warming a tire of a driven wheel of a vehicle, the vehicle including one or more driven wheels and one or more non-driven wheels, the method comprising:
   determining a range of a transmission associated with the vehicle;
   determining a position of a throttle pedal associated with an engine of the vehicle; and
   based on the determined range of the transmission and the determined position of the throttle pedal, outputting one or more control signals to apply a braking force to the one or more non-driven wheels of the vehicle and outputting one or more control signals to rotate the one or more driven wheels at a speed greater than a vehicle speed to warm the tire of the one or more driven wheels based on the position of the throttle pedal,
   wherein the one or more driven wheels comprise a first driven wheel and a second driven wheel, and the method further comprises:
   determining a speed of the first driven wheel and a speed of the second driven wheel; and
   disabling the warming of the tire of the one or more driven wheels based on a comparison of the speed of the first driven wheel and the speed of the second driven wheel.

2. The method of claim 1, wherein prior to determining the range of the transmission, determining the position of the throttle pedal and outputting the one or more control signals, the method further comprises:
   receiving a request for warming of the tire;
   estimating a speed of the vehicle based on at least a vehicle speed sensor; and
   enabling the warming of the tire based on the receipt of the request, the estimated speed of the vehicle and the determined range of the transmission is a park range or a neutral range.

3. The method of claim 1, wherein the determined range of the transmission is a drive range or a low range.

4. The method of claim 1, wherein determining the position of the throttle pedal further comprises:
   determining the position of the throttle pedal has changed from substantially zero percent throttle to substantially 100 percent throttle in less than a predetermined period of time.

5. The method of claim 1, wherein determining the position of the throttle pedal further comprises:
   determining that the position of the throttle pedal remains at least substantially 96 percent throttle.

6. The method of claim 1, further comprising:
   estimating a speed of the vehicle based on at least a vehicle speed sensor; and
   outputting a disable interface for display on a display based on the estimated speed of the vehicle.

7. The method of claim 1, wherein the method further comprises:
   outputting a disable interface for display on a display based on the comparison of the speed of the first driven wheel and the speed of the second driven wheel.

8. A system for warming a tire associated with a driven wheel of a vehicle, the vehicle including the one or more driven wheels and one or more non-driven wheels, the system comprising:
   a source of range data associated with a transmission of the vehicle;
   a source of data that indicates a position of a throttle pedal associated with the vehicle; and
   a control module having a processor that:
   determines that the position of the throttle pedal has changed from substantially zero percent throttle to substantially 100 percent throttle in less than a first predetermined period of time;
   determines that the position of the throttle pedal is held to at least substantially 96 percent throttle;
   outputs one or more control signals to apply a brake torque to the one or more non-driven wheels based on the range of the transmission and the determined positions of the throttle pedal;
   outputs one or more control signals to rotate the one or more driven wheels at a speed greater than a vehicle speed to warm the tire of the one or more driven wheels based on the position of the throttle pedal; and
   outputs one or more control signals to return the position of the throttle pedal to substantially no throttle based on an expiration of a second predetermined period of time.

9. The system of claim 8, further comprising a source of vehicle speed data, wherein the control module outputs the one or more control signals based on the vehicle speed data.

10. The system of claim 8, wherein the control module outputs a disable interface for display on a display based on the position of the throttle pedal as less than 96 percent throttle.

11. The system of claim 8, further comprising a source of wheel speed data for each of the one or more driven wheels, wherein the control module outputs a disable interface for display on a display and disables the warming of the tire of the one or more driven wheels based on a comparison of the speed of each of the one or more driven wheels.

12. The system of claim 8, further comprising a source of vehicle speed data, and the control module outputs a disable interface for display on a display based on the vehicle speed data.

13. The system of claim 8, further comprising a source of a request to warm the tire, and the control module outputs the one or more control signals to apply the brake torque to the one or more non-driven wheels based on the request, the range of the transmission and the position of the throttle pedal.

14. A vehicle, comprising:
   a powertrain coupled to one or more driven wheels, each of the one or more driven wheels including a tire, the powertrain including a transmission and an engine;
   a source of range data that indicates a range of the transmission;
   a source of data that indicates a position of a throttle pedal associated with the engine;
   a source of vehicle speed data that indicates a speed of the vehicle; and a control module having a processor that outputs one or more control signals to apply a brake force to the one or more non-driven wheels based on the range of the transmission, the position of the throttle pedal and the vehicle speed data, and the control module outputs one or more control signals to rotate the one or more driven wheels at a speed greater than a vehicle speed to warm the tire of the one or more driven wheels based on the position of the throttle pedal, wherein the control module outputs one or more control signals to change the position of the throttle pedal based on an expiration of a predetermined period of time.

15. The vehicle of claim 14, further comprising:

a source of a request to warm each of the tires of the one or more driven wheels; and a display, wherein the control module outputs a user interface to the display based on the range of the transmission, the position of the throttle pedal and the vehicle speed data.

16. The vehicle of claim 14, further comprising a source of wheel speed data for each of the one or more driven wheels, and the control module outputs a disable interface for display on a display associated with the vehicle and disables the warming of the tire of the one or more driven wheels based on a comparison of the speed of each of the one or more driven wheels.

17. The vehicle of claim 14, wherein the range of the transmission is a drive range or a low range.

18. The vehicle of claim 14, wherein based on the vehicle speed data, the control module queries a datastore to determine a brake torque value for the vehicle speed data, and outputs the one or more control signals based on the brake torque value.

* * * * *